United States Patent [19]

Lauba et al.

[11] 4,282,900
[45] Aug. 11, 1981

[54] EXTENDED LIFE SPOOL VALVE

[75] Inventors: Andu Lauba, Bellevue; Egil R. Pettersen, Kent, both of Wash.

[73] Assignee: The Boeing Company, Seattle, Wash.

[21] Appl. No.: 34,330

[22] Filed: Apr. 30, 1979

[51] Int. Cl.³ .............................................. F15B 13/04
[52] U.S. Cl. ............................ 137/625.3; 137/625.69
[58] Field of Search ......................... 137/625.3, 625.69

[56] References Cited

U.S. PATENT DOCUMENTS

| | | |
|---|---|---|
| 3,899,001 | 8/1975 | Orme . |
| 3,917,221 | 11/1975 | Kubota et al. . |
| 3,954,124 | 5/1976 | Self . |
| 3,978,891 | 9/1976 | Vick . |
| 4,047,540 | 9/1977 | Orme et al. .................... 137/625.3 X |
| 4,056,125 | 11/1977 | McNabb ............................ 137/625.3 |
| 4,183,375 | 1/1980 | Vick .................................. 137/625.3 |

FOREIGN PATENT DOCUMENTS 231630 7/1944 Switzerland ........................ 137/625.69

*Primary Examiner*—Gerald A. Michalsky
*Attorney, Agent, or Firm*—James P. Hamley; B. A. Donahue

[57] ABSTRACT

An improved fluid flow control valve of the type wherein a spool is slidable within a sleeve cavity provided in the valve body. Primary fluid passageways through the body access the sleeve cavity at main orifices which form metering surfaces with lands on the spool. The improvement comprises secondary fluid passageways which carry parallel flow with the primary passageways. The secondary passageways access the sleeve cavity at sacrificial orifices which form sacrificial metering surfaces with the spool lands. The sacrificial metering surfaces carry all of the flow through the valve at the valve neutral position thus reducing flow erosion at the main metering surfaces. Valve leakage is limited to a small value determined by the total flow capacity of the secondary passages.

2 Claims, 4 Drawing Figures

EXTENDED LIFE SPOOL VALVE

BACKGROUND OF THE DISCLOSURE

The present invention pertains to the valve art and, more particularly, to means for extending the life of a spool valve.

Spool valves are well known in the hydraulic valve art. Here, a spool, having land portions thereon, rides within the sleeve cavity of the valve body. Fluid is routed through provided passageways in the valve body and accesses the sleeve cavity via metering orifices. These orifices, in cooperation with the lands on the spool, determine flow through the valve.

A particular problem with existing spool valve designs, particularly in the commercial aviation art, is erosion of the valve metering surfaces. Commercial aircraft generally employs phosphate-ester based hydraulic fluids due to their excellent fire resistant properties. These fluids, however, have been found to be highly erosive to metering surfaces.

Research on extending the life of spool valves has taken two approaches: (1) improving the hydraulic fluids, and (2) developing valve designs which erode more slowly. Progress in the former approach has been disappointing, thus the concentration on improved valve designs.

In one prior art valve design, a series of discs is stacked within the ports of the valve thus creating a labyrinth. With a labyrinth, the fluid pressure drop occurs over a relatively long path so that acceleration of the fluid is decreased at the meter surface thus reducing erosion. While tests have confirmed that this porting design extends the useful life of the valve, the labyrinth ports are difficult and, thus, costly to manufacture.

SUMMARY OF THE INVENTION

It is an object of this invention, therefore, to provide an improved design for a spool valve which results in extended valve life.

It is a further object of the invention to provide the above described improved spool valve which is both simple and inexpensive to manufacture.

Briefly, according to the invention, a fluid flow valve includes a valve body having a sleeve portion provided therein and provided primary passageways for accessing the sleeve portion at main metering orifices. A spool is slidable in the sleeve and has land portions thereon which form main metering surfaces with the main metering orifices thus controlling fluid flow through the valve. The improvement comprises secodary passageways provided in the valve body for accessing the sleeve portion at sacrificial metering orifices. These sacrificial orifices form sacrificial metering surfaces with the land portions. Also, the secondary passageways and sacrificial metering surfaces form a fluid flow path in parallel with the primary passageways and main metering surfaces such that fluid flow through the valve, in the valve's neutral position, is carried primarily by the secondary passageways and sacrificial orifices thereby reducing fluid flow erosion at the main metering surfaces.

Preferably, the land portions overlap the main metering orifices at the neutral position of the valve whereas the land portions underlap the sacrificial orifices at the neutral position.

Also, it is preferable that the secondary passageways be small relative to the main passageways, thus reducing leakage flow through the valve.

DETAILED DESCRIPTION OF THE PREFERRED EMBODIMENT OF THE INVENTION

Figure 1:
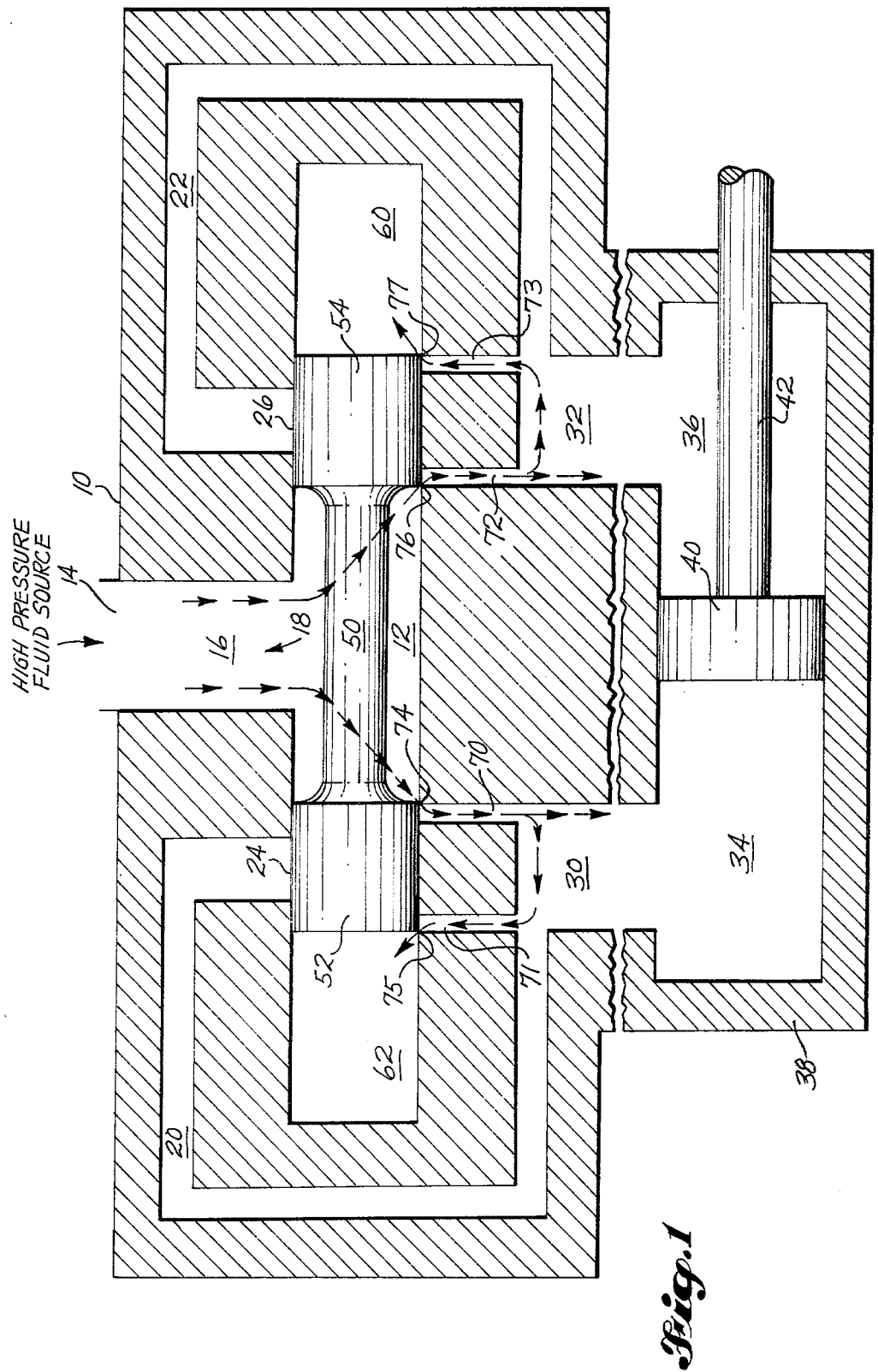
FIG. 1 is a cross sectional view of the preferred embodiment of the spool valve according to the invention.

FIG. 1 is a cutaway view illustrating the construction of the preferred embodiment of the improved spool valve. Here, a valve body 10 is provided with an inner sleeve cavity 12. An input port 14 is adapted to be connected to a high pressure fluid source. Fluid from this source passes through input 14 through a primary passageway, indicated generally at 16, and accesses the cavity 12 at an input port orifice 18. In addition, primary passageways 20, 22 access the cavity 12 via first and second main metering orifices 24, 26, respectively. Primary passageways 20, 22 lead to output ports 30, 32, respectively, which are adapted to be coupled to cylinder portions 34, 36 of a conventional actuator 38. Actuator 38 is also provided with a cylinder 40 having an actuator rod 42 attached thereto. Rod 42 would normally be connected to a device to be driven, such as the flap of an airplane.

A spool 50 is slidably contained within the sleeve cavity 12. Provided on the spool 50 are land portions 52, 54 which form main metering surfaces with the main metering orifices 24, 26, respectively.

Thus, as in the typical design of such spool valves, an operator, such as the pilot of an aircraft, locates the position of spool 50 within the cavity 12 to route the high pressure fluid either out output port 30, or output port 32 to thereby create an imbalance in cylinder portions 34, 36 and relocate cylinder 40 within actuator 38. Returned fluid from the opposing cylinder portion is routed through return passageways 60, 62 respectively to the fluid source reservoir.

The particular improvement according to the instant invention utilizes secondary passageways 70-73 provided in valve body 10. These secondary passageways access the sleeve cavity 12 at sacrificial orifices 74-77 respectively. The sacrificial orifices 74-77 form sacrificial metering surfaces with the land portions 52, 54 on spool 50.

Preferably, as shown in FIG. 1, the land portions 52, 54 overlap the main metering orifices 24, 26 whereas the sacrificial orifices 74-77 are underlapped by land portions 52, 54.

The secondary passages 70-73 and sacrificial metering surfaces form a fluid flow path which is in parallel with the primary passageways and main metering surfaces such that fluid flow through the valve, in the valve's neutral position, is carried solely by the secondary passageways and sacrificial orifices. This, therefore, reduces fluid flow erosion at the main metering surfaces.

Further, total valve leakage is limited to a low value determined by the saturation flow of the relatively small secondary passages 70–73. Thus, as shown in the neutral position, fluid flows from the high pressure fluid source through the sacrificial orifices 74, 76, to the output ports 30, 32 for driving the actuator 38 and then through sacrificial orifices 75, 77 to the return passages 60, 62.

Figure 2:
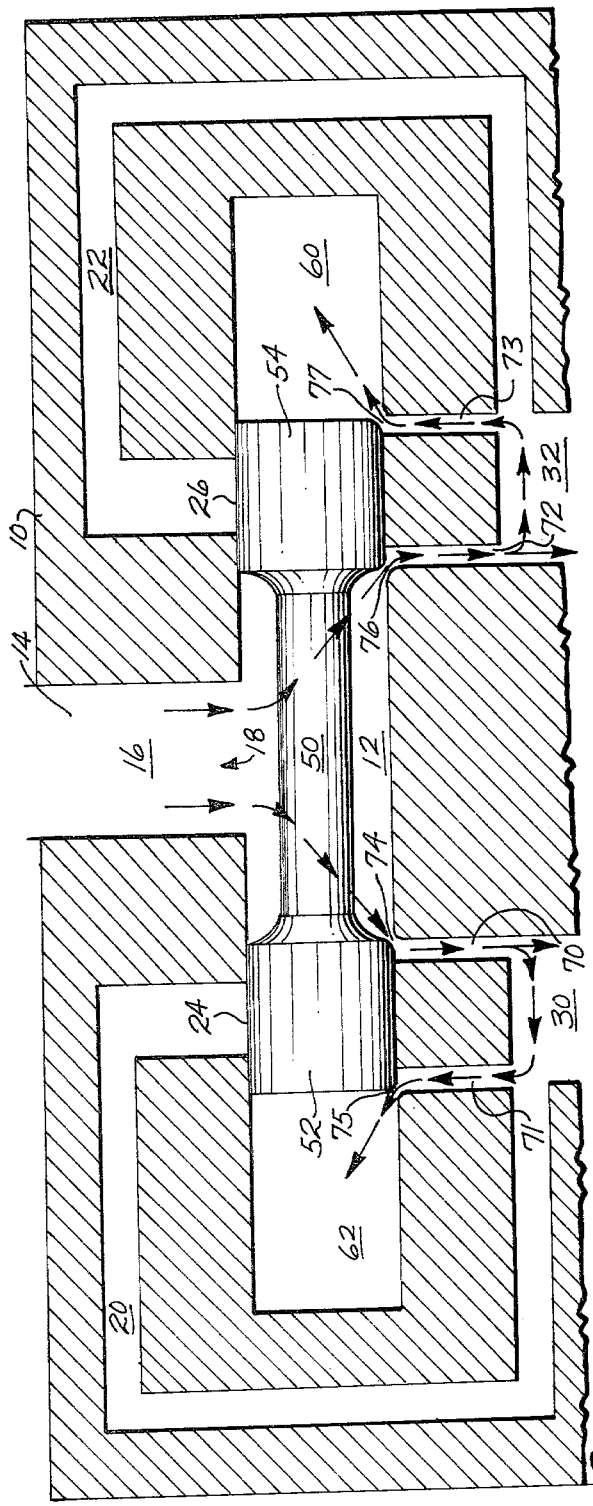
FIG. 2 illustrates initial erosion of the sacrificial ports of the valve shown in FIG. 1.
Figure 3:
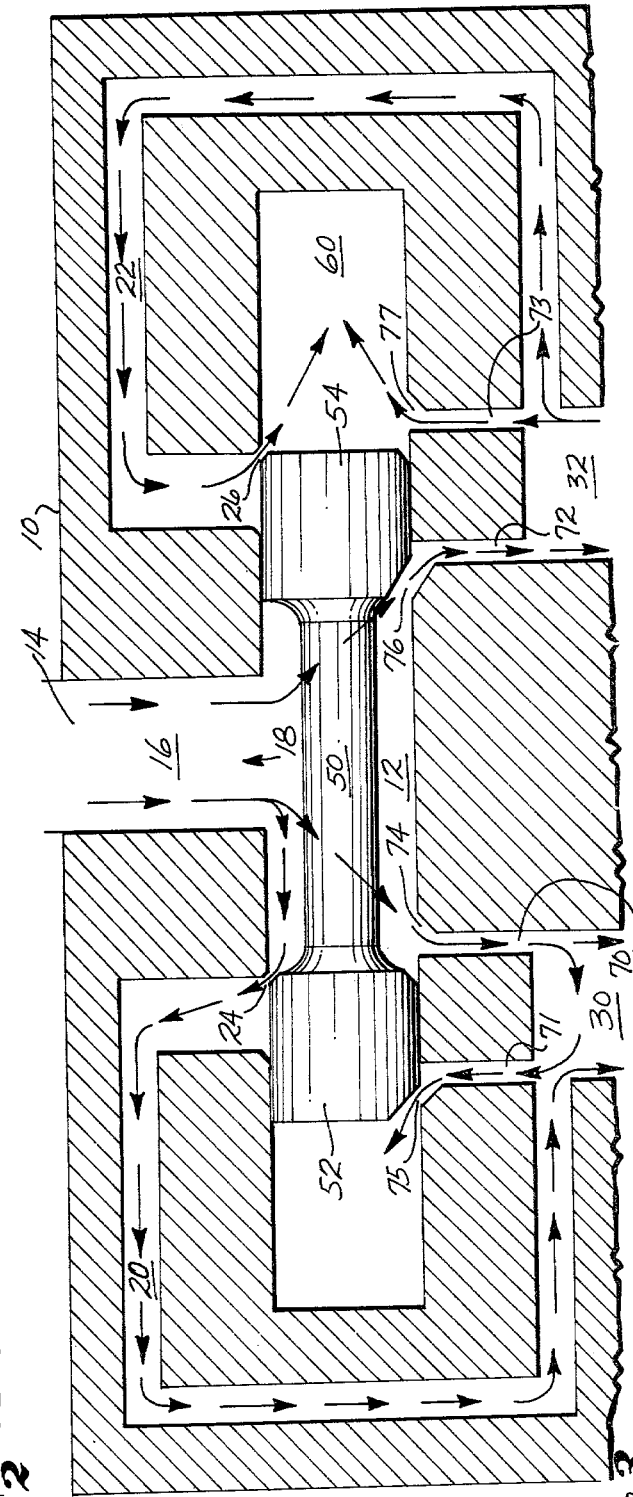
FIG. 3 illustrates extended erosion of the sacrificial metering surfaces and initial erosion of the main metering surfaces of the improved valve.
Figure 4:
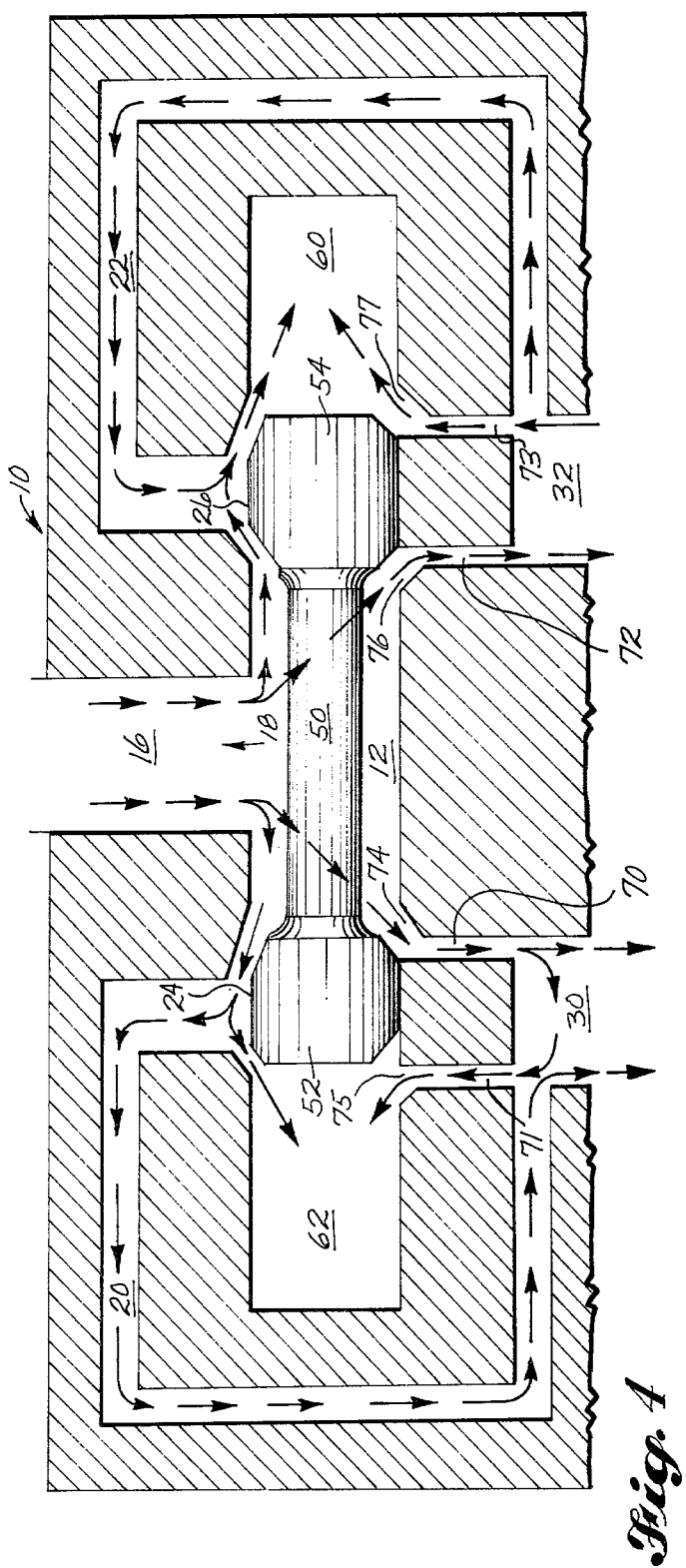
FIG. 4 illustrates total erosion of the improved valve design.

FIGS. 2 through 4 indicate the erosion process of the improved spool valve shown in FIG. 1. Thus, identical numerals are used throughout.

FIG. 2 illustrates the early erosion effects of the hydraulic fluid on the spool valve shown in FIG. 1. Here, since flow at neutral occurs solely through the sacrificial orifices 74–77, wear is seen only at these metering surfaces and not at the main metering surfaces formed by land portions 52, 54 with main metering orifices 24, 26.

In FIG. 3, the sacrificial metering surfaces have worn to the point that when the valve is not at its neutral position, as is the case when the associated actuator is carrying a load, the erosion of the orifices is unsymmetrical. This causes the valve to shift, as erosion progresses, to keep the proper pressure balance for the load. This shifting eventually exposes the main orifices 24, 26 to leakage flow, resulting in an increased erosion rate. Now, flow, as indicated by the arrows, occurs at the main metering surfaces formed by land portions 52, 54 and main metering orifices 24, 26.

Finally, as shown in FIG. 4, the main metering surfaces have eroded to the point that leakage exceeds a tolerable level, whereby the valve becomes nonfunctional.

Tests on the instant valve configuration have demonstrated its superior long life characteristic. This is achieved through the use of leakage restricting, parallel secondary passageways with sacrificial orifices and metering surfaces. Despite the valve's longevity in use, it is relatively simple and inexpensive to manufacture.

Whereas a preferred embodiment of the invention has been described in detail, it should be apparent that many modifications and variations thereto are possible, all of which fall within the true spirit and scope of the invention.

We claim:

1. In a fluid flow valve having:
   a valve body including a sleeve portion provided therein and provided primary passageways for accessing said sleeve portion at main metering orifices; and
   a spool being slidable in said sleeve portion and having land portions thereon for forming main metering surfaces with said main metering orifices to control fluid flow through the valve, the improvement comprising:
   secondary passageways provided in said valve body for accessing said sleeve portion at sacrificial metering orifices, said sacrificial orifices forming sacrificial metering surfaces with said land portions, said secondary passageways and sacrificial metering surfaces being predeterminedly positioned relative to said primary passageways and main metering surfaces for forming a fluid flow path in parallel with said primary passageways and main metering surfaces and said land portions underlapping said sacrificial metering surfaces and overlapping said main metering surfaces in the valve's neutral position such that fluid through the valve, in the valve's neutral position, is carried by said secondary passageways and sacrificial orifices thereby reducing fluid flow erosion at said main metering surfaces.

2. The improved fluid flow valve of claim 1 wherein said secondary passageways are small relative to said primary passageways such that said secondary passageways limit leakage flow through the valve.

* * * * *